(12) United States Patent
Kypreos

(10) Patent No.: US 11,882,314 B2
(45) Date of Patent: Jan. 23, 2024

(54) SYSTEMS AND METHODS FOR MEASURING VISUAL QUALITY DEGRADATION IN DIGITAL CONTENT

(71) Applicant: MK Systems USA Inc., Wilmington, DE (US)

(72) Inventor: Jean Kypreos, Betton (FR)

(73) Assignee: MK Systems USA Inc., Wilmington, DE (US)

( * ) Notice: Subject to any disclaimer, the term of this patent is extended or adjusted under 35 U.S.C. 154(b) by 0 days.

(21) Appl. No.: 17/862,224

(22) Filed: Jul. 11, 2022

(65) Prior Publication Data

US 2022/0353544 A1 Nov. 3, 2022

Related U.S. Application Data

(63) Continuation of application No. 17/063,181, filed on Oct. 5, 2020, now Pat. No. 11,425,425.

(30) Foreign Application Priority Data

Nov. 22, 2019 (EP) .................................... 19306507

(51) Int. Cl.
*H04N 19/86* (2014.01)
*H04N 19/154* (2014.01)
*H04N 19/176* (2014.01)
*H04N 19/61* (2014.01)

(52) U.S. Cl.
CPC ........... *H04N 19/86* (2014.11); *H04N 19/154* (2014.11); *H04N 19/176* (2014.11); *H04N 19/61* (2014.11)

(58) Field of Classification Search
CPC .... H04N 19/86; H04N 19/154; H04N 19/176; H04N 19/61
USPC ...................................................... 375/240.29
See application file for complete search history.

(56) References Cited

U.S. PATENT DOCUMENTS

| | | |
|---|---|---|
| 2004/0012675 A1 | 1/2004 | Caviedes |
| 2011/0069138 A1 | 3/2011 | Ali et al. |
| 2011/0075729 A1 | 3/2011 | Dane et al. |
| 2011/0135012 A1 | 6/2011 | Li et al. |

(Continued)

OTHER PUBLICATIONS

Menor, et al. "Objective Video Quality Assessment Based on Neural Networks," Procedia Computer Science, vol. 96, Sep. 2016, pp. 1551-1559, 9 pages.

(Continued)

*Primary Examiner* — Nguyen T Truong
(74) *Attorney, Agent, or Firm* — Norton Rose Fulbright US LLP

(57) ABSTRACT

Disclosed here are methods, systems, and devices for measuring visual quality degradation of digital content caused by an encoding process. There is received first data for a digital content item, which is not encoded by the encoding process, and second data for the digital content item, which is encoded by the encoding process. For a given artefact type, the first data and the second data are processed to obtain a first quality metric measuring visual quality degradation in the digital content item attributable to the given artefact type caused by the encoding process. A stored mapping corresponding to the given artefact type is applied to the first quality metric to obtain a second quality metric which measures visual quality degradation in the digital content item attributable to the given artefact type caused by the encoding process and approximates subjective assessment of the digital content item by a human visual system.

20 Claims, 15 Drawing Sheets

(56) References Cited

U.S. PATENT DOCUMENTS

2012/0020557 A1     1/2012   Gaubatz et al.
2012/0269441 A1   10/2012   Marchesotti et al.
2017/0365047 A1   12/2017   Bequéet al.
2018/0300869 A1   10/2018   Aaron et al.
2018/0343458 A1   11/2018   Katsavounidis et al.

OTHER PUBLICATIONS

European Patent Office, Communication, Partial European Search Report issued for European Application No. 19306507.5, dated Mar. 12, 2020, 14 pages.

European Patent Office, Communication, Extended European Search Report issued for European Application No. 19306507.5, dated Jun. 25, 2020, 11 pages.

European Patent Office, Communication Pursuant to Article 94(3) EPC issued for European Application No. 19306507.5, dated Mar. 24, 2023, 5 pages.

Hu, B. et al. "Perceptual Quality Evaluation for Motion Deblurring," IET Compt. Vis. 2018; 12(6): pp. 796-805, 10 pages.

SYSTEMS AND METHODS FOR MEASURING VISUAL QUALITY DEGRADATION IN DIGITAL CONTENT

CROSS-REFERENCE TO RELATED APPLICATIONS

This application is a continuation of U.S. patent application Ser. No. 17/063,181, titled "SYSTEMS AND METHODS FOR MEASURING VISUAL QUALITY DEGRADATION IN DIGITAL CONTENT," filed Oct. 5, 2020, claiming priority to European Patent Application No. 19306507, titled "SYSTEMS AND METHODS FOR MEASURING VISUAL QUALITY DEGRADATION IN DIGITAL CONTENT," filed on Nov. 22, 2019, the disclosures of which are incorporated herein by reference in their entirety.

TECHNICAL FIELD

This disclosure relates to processing of digital content such as images and videos, and more particularly, to methods, devices, systems, and software for measuring visual quality in such digital content.

BACKGROUND OF THE INVENTION

Modern life has seen the proliferation of digital content such as images and videos. Vast amounts of digital content are stored electronically, transmitted across telecommunication channels and networks such as the Internet, and displayed on screens worldwide. Digital content may be encoded by numerous processes, e.g., to be suitable for storage, transmission, display, etc. Some of these processes reduce signal fidelity, which results in degradation in the visual quality of the digital content.

BRIEF SUMMARY OF THE INVENTION

In accordance with one aspect, there is provided a computer-implemented method for measuring visual quality degradation of digital content caused by an encoding process. The method includes storing, for each of a plurality of visual artefact types: a corresponding mapping from (i) quality metrics measuring visual quality degradation attributable to a given visual artefact type, measured on an objective basis, to (ii) quality metrics measuring visual quality degradation attributable to the given visual artefact type, which approximate subjective assessment by a human visual system. The method also includes receiving first data for a digital content item, the first data not encoded by the encoding process; receiving second data for the digital content item, the second data encoded by the encoding process; and for at least a given one of the plurality of visual artefact types: processing the first data and second data to obtain a first quality metric measuring visual quality degradation in the digital content item attributable to the given artefact type caused by the encoding process; and applying the mapping, corresponding to the given artefact type, to the first quality metric to obtain a second quality metric, wherein the second quality metric measures visual quality degradation in the digital content item attributable to the given artefact type caused by the encoding process and approximates subjective assessment of the digital content item by a human visual system.

In accordance with another aspect, there is provided a computing system for measuring visual quality degradation of digital content caused by an encoding process. The system includes: at least one memory storing, for each of a plurality of visual artefact types: a corresponding mapping from (i) quality metrics measuring visual quality degradation attributable to a given visual artefact type, measured on an objective basis to (ii) quality metrics measuring visual quality degradation attributable to the given visual artefact type, which approximate subjective assessment by a human visual system; and processor-executable instructions. The system also includes at least one processor in communication with the at least one memory, the at least one processor configured to execute the processor-executable instructions to: receive first data for a digital content item, the first data not encoded by the encoding process; receive second data for the digital content item, the second data encoded by the encoding process; and for at least a given one of the plurality of visual artefact types: process the first data and second data to obtain a first quality metric measuring visual quality degradation in the digital content item attributable to the given artefact type caused by the encoding process; and apply the mapping, corresponding to the given artefact type, to the first quality metric to obtain a second quality metric, wherein the second quality metric measures visual quality degradation in the digital content item attributable to the given artefact type caused by the encoding process and approximates subjective assessment of the digital content item by a human visual system.

Many further features and combinations thereof concerning embodiments described herein will appear to those skilled in the art following a reading of the instant disclosure.

BRIEF DESCRIPTION OF THE DRAWINGS

For a more complete understanding of the present disclosure, reference is now made to the following descriptions taken in conjunction with the accompanying drawing, in which.

These drawings depict exemplary embodiments for illustrative purposes, and variations, alternative configurations, alternative components and modifications may be made to these exemplary embodiments.

DETAILED DESCRIPTION OF THE INVENTION

In this disclosure, various abbreviations are used to improve concision and/or clarity, including the following:

| | |
|---|---|
| AV1 | AOMedia Video 1 |
| HDR | High Dynamic Range |
| HEVC | High Efficiency Video Coding |
| JPEG | Joint Photographic Experts Group |
| PSNR | Peak Signal Noise to Ratio |
| PSNR-HVS | Peak Signal Noise to Ratio-Human Vision System |
| MOVIE | Motion-tuned Video Integrity Evaluation |
| MS-SSIM | Multi-Scale Structural Similarity Index SSIM |
| MPEG | Moving Picture Experts Group |
| SSIM | Structural Similarity Index |
| stVSSIM | Spatio-Temporal Video SSIM |
| SDR | Standard Dynamic Range |
| SVC | Scalable Video Coding |
| VDP | Visual Difference Predictor |
| VIF | Visual Information Fidelity |
| VMAF | Video Multi-Method Assessment Fusion |
| VVC | Versatile Video Coding |

Figure 1:
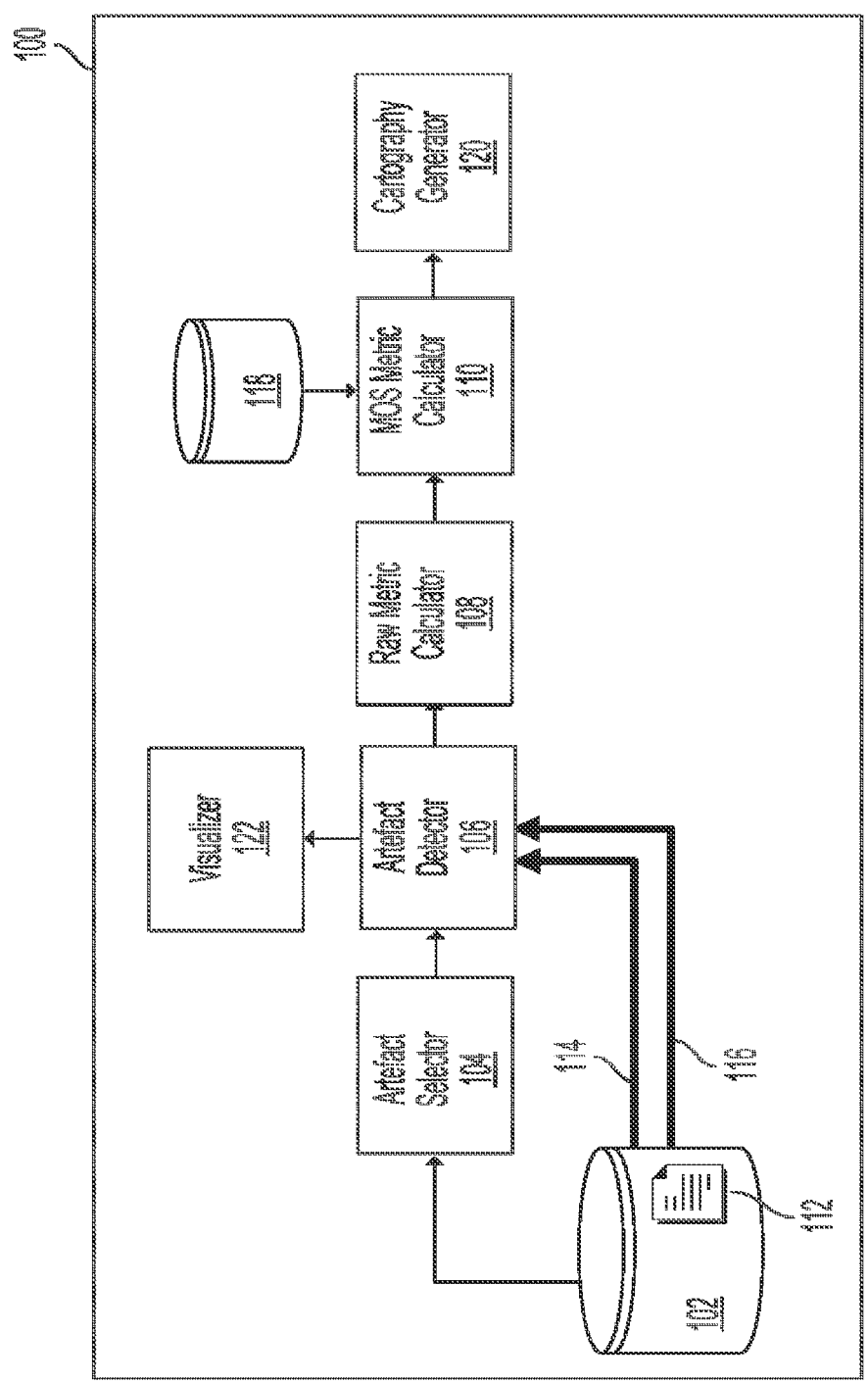
FIG. 1 is a schematic diagram of a visual quality assessment system, in accordance with an embodiment.

FIG. 1 schematically illustrates a visual quality assessment system 100 that measures visual quality degradation of digital content, in accordance with an embodiment.

Assessment system 100 is configured in manners detailed herein to assess visual quality degradation caused by various types of encoding processes applied to digital content, such as compression processes, filtering processes, encoding conversion processes, etc. Such degradation are manifested as various types of visual artefacts, which may include various types of spatial artefacts and various types of temporal artefacts. The presence and severity of particular types of visual artefacts may depend on the nature of the digital content and the encoding process(es) that have been applied.

Example processes to which assessment system 100 can be applied include, for example, MPEGx, HEVC, SVC, VVC, JPEG2000, AV1, and the like. Other example processes include, for example, filtering processes (e.g., upsampling, downsampling, de-interlacing), conversion from HDR to SDR, etc.

As detailed herein, assessment system 100 measures visual quality degradation attributable to each of a plurality of visual artefact types. More specifically, assessment system 100 generates metrics of visual quality degradation specifically attributable to particular visual artefacts types in manners such that the metrics approximate subjective assessment of digital content by a human visual system.

In the depicted embodiment, assessment system 100 includes an electronic datastore 102 for storing data of a plurality of digital content items 112. In this embodiment, electronic datastore 102 stores data of digital content items 112 in a first form 114 that has not been processed by the encoding process(es) subject to assessment, which may be referred to herein as "original content items" or simply as "original content". In this embodiment, electronic datastore 102 also stores data of digital content items 112 in a second form 116 that has been processed by the encoding process(es) subject to assessment, and consequently subject to possible image quality degradation. Digital content items 112 in this second form 116 may be referred to herein as "degraded content items" or simply as "degraded content".

Electronic datastore 102 may also store various metadata descriptive of particular digital content items 112, including, e.g., color space information, the types of encoding process(es) used. Digital content items 112 may include various images, image sequences (i.e., a set of temporally related images), and videos.

Assessment system 100 also includes an artefact selector 104 that selects artefacts types relevant to a particular digital content item 112 under assessment. To this end, artefact selector 104 maintains a list of defined artefact types and mappings of subsets of the defined artefact types to characteristics of digital content items 112.

The set of artefact types maintained at artefact selector 104 may include spatial artefact types and/or temporal artefact types. In the depicted embodiment, the list of defined artefact types maintained at artefact selector 104 includes the following spatial artefact types:

Ringing: Variations of pixel luminance along edges due to frequency oscillations;

Blocking: Apparitions of block edges/regular structures which do not belong to the image; and Blurring: Losses of spatial details or sharpness at edges or in textured regions.

In this embodiment, the set of artefact types maintained at artefact selector 104 includes the following temporal artefact types, which manifest when, for example, there is broken motion (e.g. no motion is detected in the degraded content though motion exists in the original content) or wrong motion (e.g., wrong amplitude, direction and/or angle).

MotionDisparity: Degradation manifested by differences between motion in a degraded content item and motion in an original content item, as further detailed below.

Wobble: When broken motion (no motion) exists in a degraded content item while motion exists in an original content item. For example, when motion is broken along several pictures, this artefact may be very prominent to a viewer. Wobble may be especially prominent in content items that are videos of sporting events.

Flickering: Artefact caused by local temporal variation of blocks (group of pixels) between two consecutive frames. For example, there may be two different representations of the same object in a current frame and in the previous frame due to an inaccurate motion estimation, or a coarse quantization of that object, etc. A distortion is computed at block level between a block in the frame at a instant T and the motion compensated block in the frame at instant T−1, as further detailed below.

Pulsing: particular case of Flickering artefact (as defined previously) as it occurs when one or several groups of blocks (i.e. area of pixels) are detected as flickering, visually observed as an instantaneous artefact as it appears and then disappears. Pulsing is much easily detected when it appears several times in a video sequence, for example with the coding of periodic intra pictures every second where this artefact may be visible every second. This artefact is detected when the number of flickering blocks in a frame exceeds a pre-defined threshold.

The mapping of subsets of the defined artefact types to particular characteristics of digital content items 112 are pre-defined and stored at artefact selector 104. In the depicted embodiment, the mapping is defined based on characteristics including color space of a digital content item 112 (e.g., RGB, YUV, XYZ, CIELAB, IPT, etc.) and the type of encoding process applied to the digital content item 112.

Figure 2:
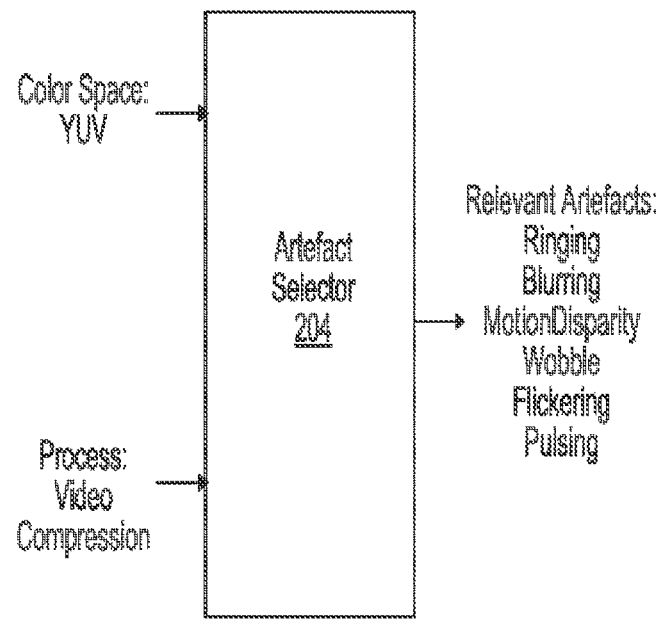
FIG. 2 shows an example mapping to relevant artefact types, provided by an artefact selector of the visual quality assessment system of FIG. 1, in accordance with an embodiment.

FIG. 2 shows an example mapping provided by artefact selector 104 for a digital content item 112 that has been encoded by a video compression process, and is encoded in the YUV color space. For these input characteristics, artefact selector 104 generates a list of seven relevant artefact types, as shown. In another example, e.g., when processing type is an up-sampling process using traditional spatial processing, the list of relevant artefact types may consist of blurring, ringing, and flickering. In another example, when the processing type is advanced up-sampling using motion processing or machine learning, the list of relevant artefact types may consist of blurring, ringing, flickering, and MotionDisparity. In another example, when the processing type is HDR to SDR conversion, the list of relevant artefact types may consist of: blurring, blocking, and flickering.

In other embodiments, the mappings of artefact selector 104 may be defined based on various other factors including, for example, the presence of luminance/chrominance channels in which artefacts may be present, the dynamic range of the digital content item 112 (e.g., SDR, HDR, etc.), the content type of the item 112 under assessment (e.g., sporting event, animation, etc.).

Although certain example artefact types are describe above, in other embodiments, artefact selector 104 may maintain a list of defined artefact types omitting certain of the artefact types listed above and/or including other artefact types. Various other artefact types are known or may be defined by those of ordinary skill in the art.

Artefact detector 106 applies image processing algorithms to digital content items 112 under assessment to detect the presence of particular artefact types, and where applicable, the pixel locations of particular artefact types. In the depicted embodiment, artefact detector 106 receives data for a particular digital content item 112 in a first form 114 (i.e., corresponding to the original content) and a second form 116 (i.e., corresponding to the degraded content). Artefact detector 106 processes the data for the original content and the degraded content to measure the degree of degradation in the degraded content.

Raw metric calculator 108 operates in concert with artefact detector 106 to generate quality metrics measuring, on an objective basis, visual quality degradation attributable to artefacts types detected by artefact detector 106. Such metrics may be referred to herein as "objective metrics", for convenience. In the depicted embodiment, the output of raw metric calculator 108 includes a plurality of objective metrics, each particular objective metric measuring degradation caused by a corresponding particular artefact type, on an objective basis. These objective metrics are provided to MOS metric calculator 110.

MOS metric calculator 110 receives objective metrics from raw metric calculator 108 and calculates corresponding mean opinion score (MOS) metrics, which approximate subjective assessment by a human visual system. Such MOS metrics may be referred to herein as "subjective metrics", for convenience.

MOS metric calculator 110 calculates subjective metrics using mappings between objective metrics and subjective metrics, which are stored in electronic datastore 118. These mappings were generated according to the following procedure.

For each artefact type (e.g., each type pre-defined in artefact detector 104), a database was prepared with a plurality of original content items (e.g., videos and/or images), and for each of the original content items, several corresponding degraded content items with known degradation intensities (known objective metrics) for the particular artefact type.

A pool of human viewers viewed each of the original content items and degraded content items and assigns each degraded content item a subjective MOS score between 1 to 5, based on the following subjective scale:

| | |
|---|---|
| 5 | Imperceptible |
| 4 | Perceptible but not annoying |
| 3 | Slightly annoying |
| 2 | Annoying |
| 1 | Very annoying |

The original content items and degraded content items were presented to the human viewers according to standard protocols. For example, for video content, presentation to viewers adhered the DCR (degradation category rating) protocol defined in the ITU-T-REC-P910 standard. In accordance with this protocol, the presentation for one video followed a defined sequence: presentation of the original content for 10 seconds; presentation of grey picture for 2 seconds; presentation of a version of degraded content for 10 seconds; and vote on an MOS score during the next 5 seconds.

As a degraded content item contains a mix of several artifact types, viewers were instructed to focus only on the targeted artefact type during viewing. The scores of all viewers were averaged to obtain a subjective MOS score for each item of degraded video content.

Figure 3A:
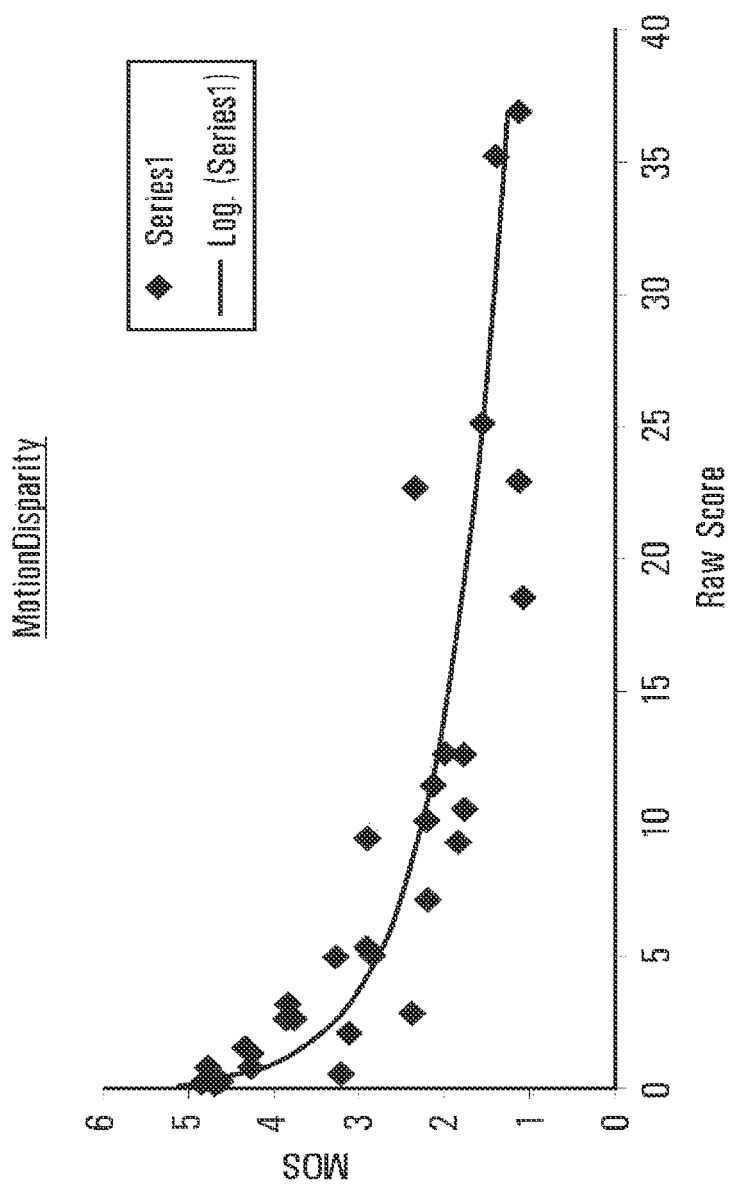
FIG. 3A and FIG. 3B are each graphs showing mappings of objective metrics to subjective metrics, in accordance with an embodiment.
Figure 3B:
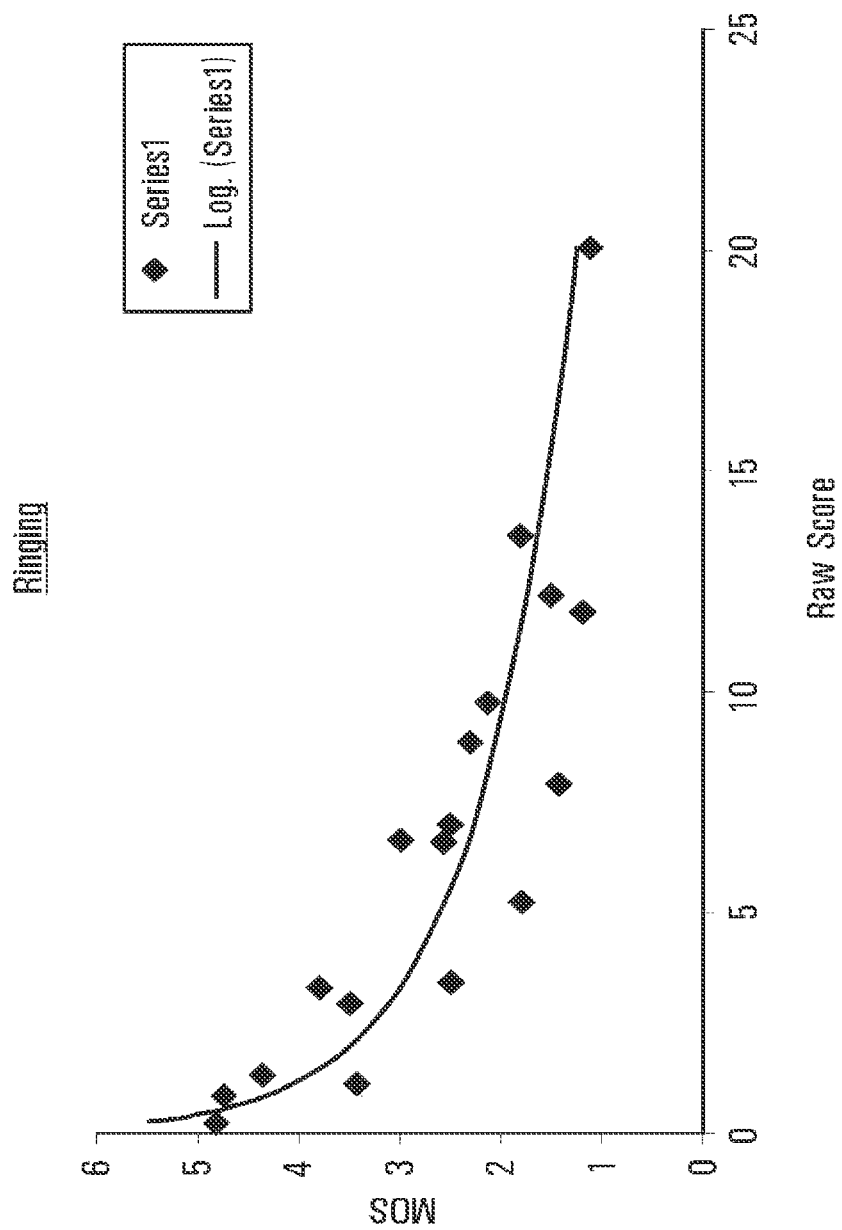

A non-linear mapping between objective (or raw) metrics and subjective MOS metrics was established for each artefact type. Each mapping is established in two steps: first, degraded video content is assessed to generate an objective (or raw) metric using a raw metric calculator such as calculator 108, and second, a curve fitting is made between the objective metrics as calculated and the subjective metrics (as voted upon by the pool of viewers). The fitted curve may, for example, be modeled by a non-linear function. These steps are repeated for each artefact type. FIG. 3A shows an example mapping established for the MotionDisparity artefact type. FIG. 3B shows an example mapping established for the Ringing artefact type.

For each artefact type, MOS metric calculator 110 applies a stored mapping (corresponding to the particular artefact type) to the objective metric received from raw metric calculator 108 to calculate a subjective metric. In the depicted embodiment, the output of MOS metric calculator 110 includes a plurality of subjective metrics, each particular subjective metric measuring degradation caused by a corresponding artefact type, on an subjective basis. Conveniently, the subjective metrics calculated by MOS metric calculator 110 are normalized to a common scale (e.g., between 1-5) which allows the relative degradation contribution of disparate artefact types to be compared.

Figure 4:
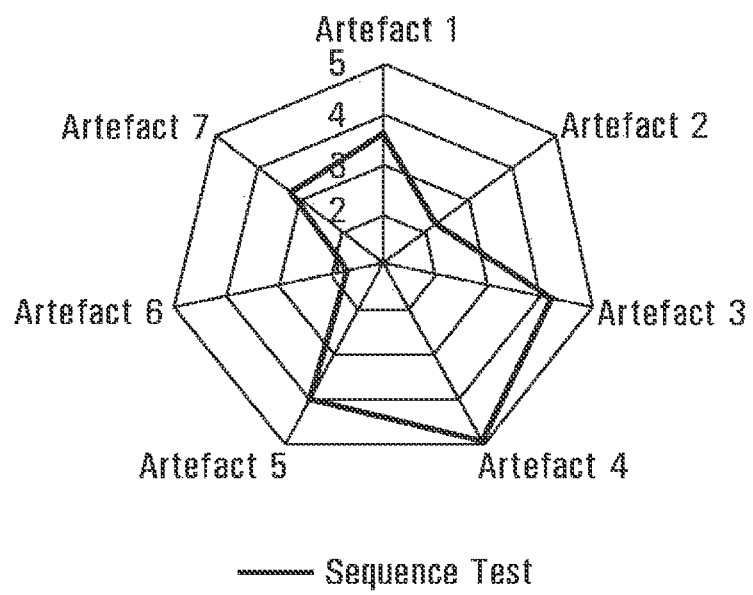
FIG. 4 is an example radar graph of subjective metrics, in accordance with an embodiment.

Cartography generator 112 receives the MOS metrics calculated by MOS metric calculator 110 and generates a digital visualization of the metrics. In the depicted embodiment, and as shown in FIG. 4, the visualization includes a radar graph, in which each of the spokes (or radii) represents one artefact type.

Figure 5A:
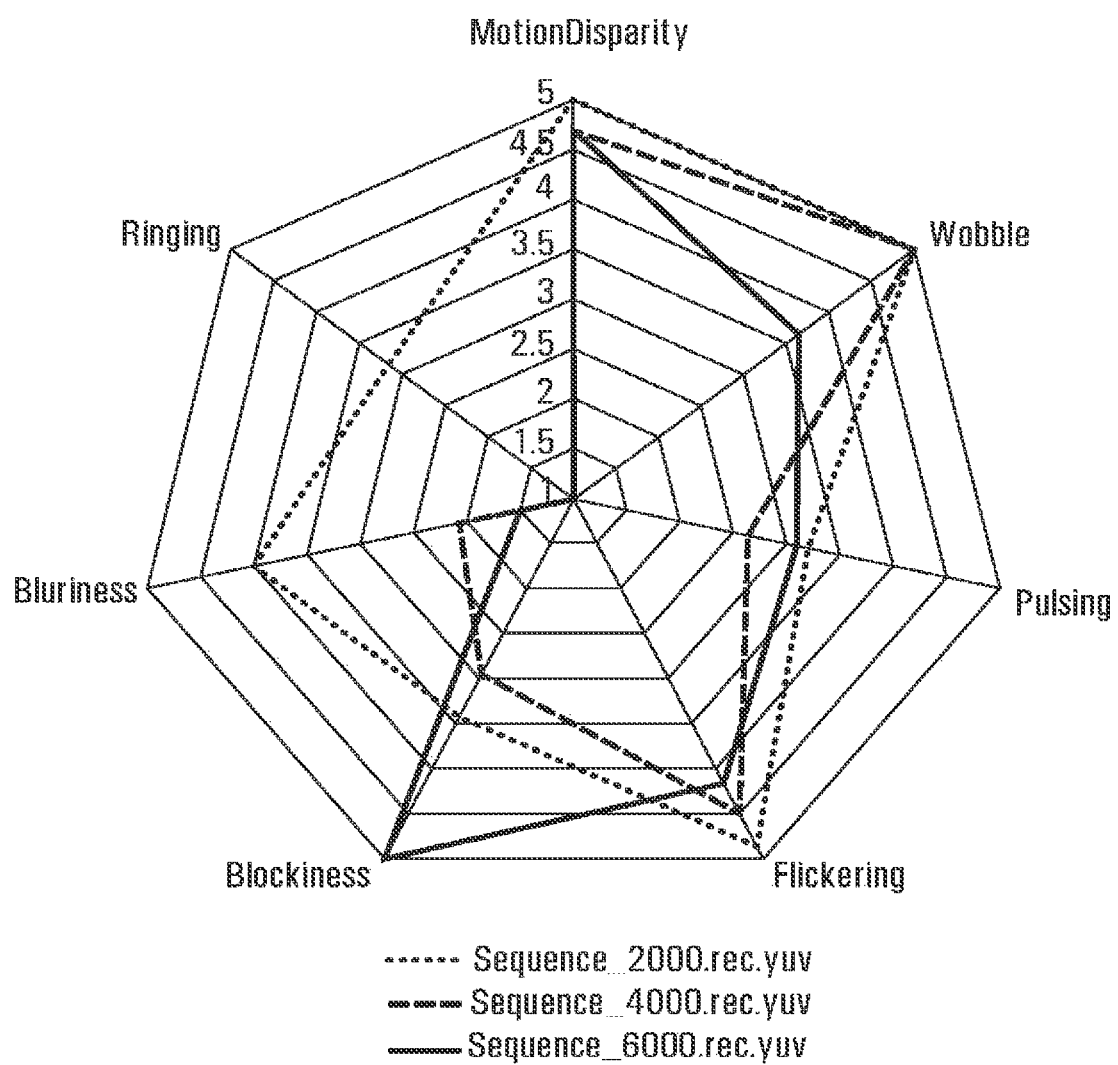
FIG. 5A, FIG. 5B, and FIG. 5C are each radar graphs of subjective metrics generated by the cartography generator of the visual quality assessment system of FIG. 1, in accordance with an embodiment.
Figure 5B:
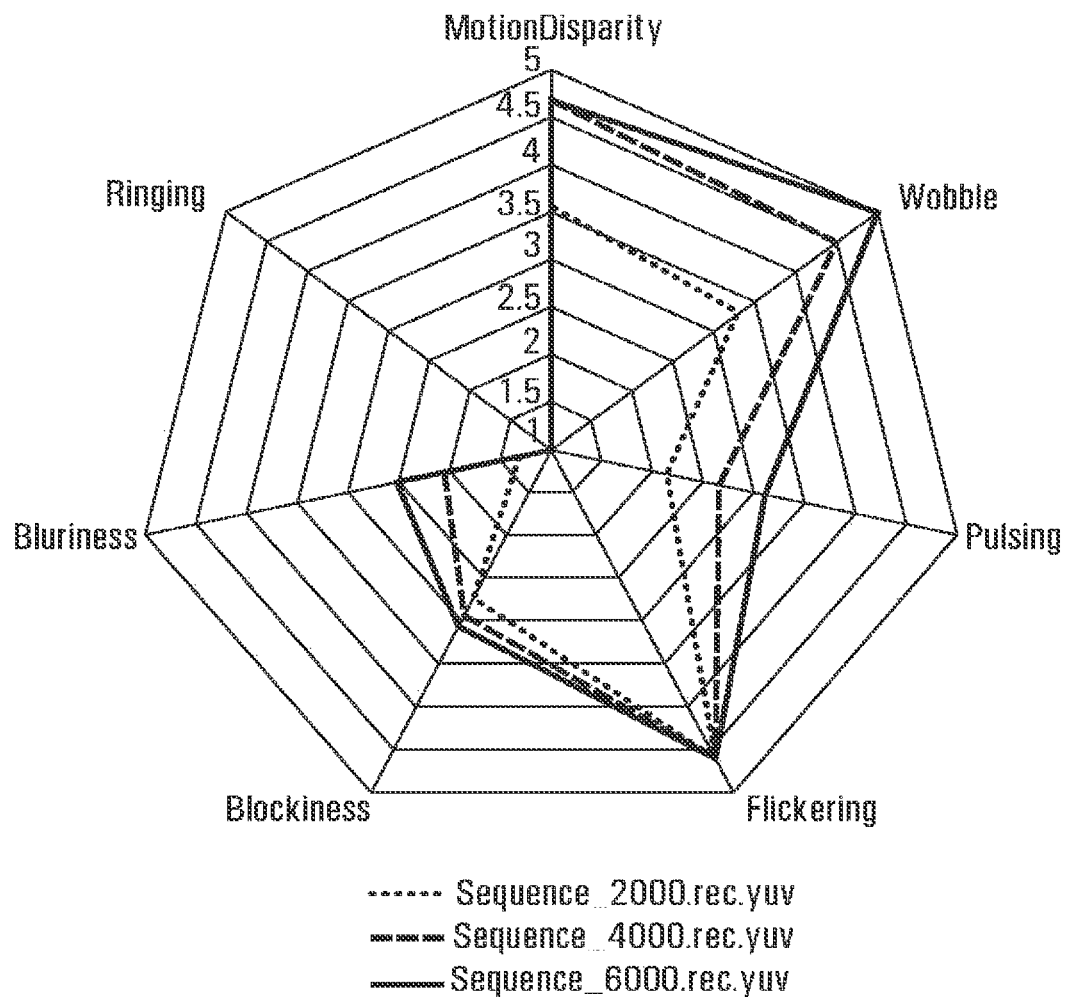
Figure 5C:
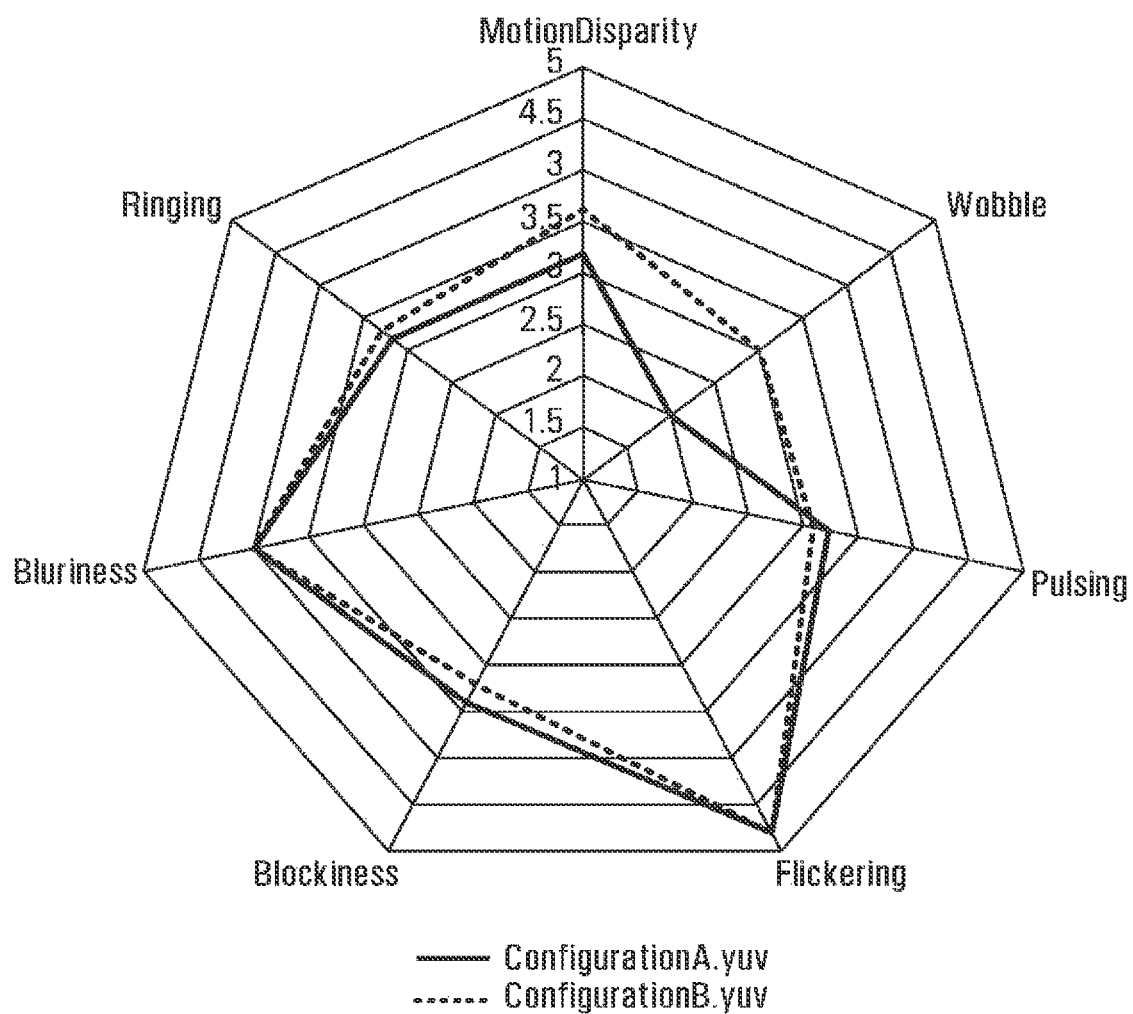

Several examples of visualizations generated by cartography generator 112 as shown in FIGS. 5A-5C. Conveniently, these visualizations allow the subjective metrics for different degraded content items to be readily compared. In on example, FIG. 5A shows subjective metrics obtained for three videos, each encoded at the same bitrate. In another example, FIG. 5B shows subjective metrics objectives obtained for a video encoded at the same bitrate but using two different encoding parameters. Such parameters may be, for example, the number of "B" frames (bi-predictive frames) between two "P" frames (predictive frames). Relevant parameters may be defined by a particular encoding standard or algorithm. Of note, these parameters may have different effects on particular artefact types. Comparisons may also be made between different quantization methods, e.g., quantization method 1 versus quantization method 2.

Figure 6A:
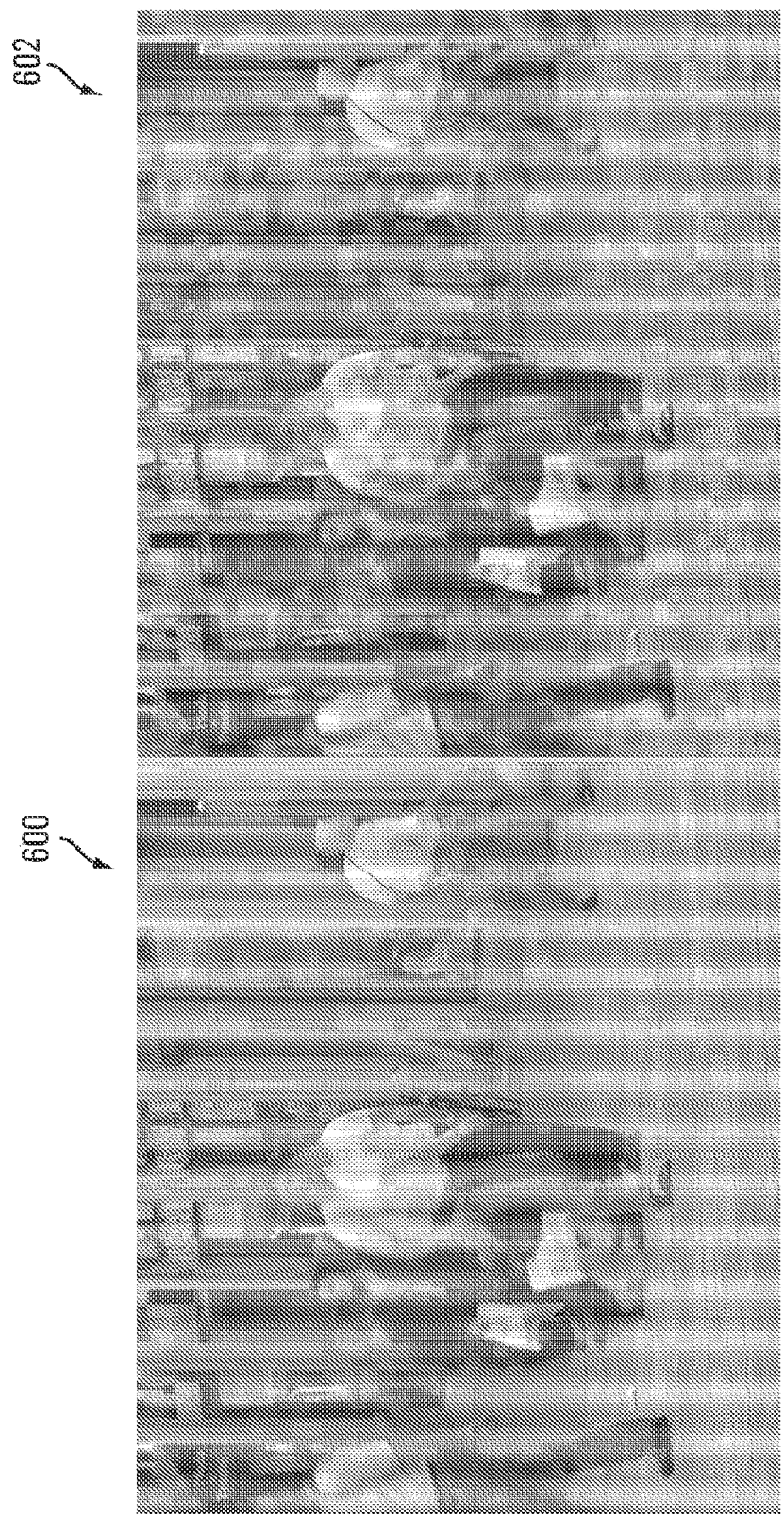
FIG. 6A and FIG. 6B are each frame visualizations generated by the visualizer of the visual quality assessment system of FIG. 1, in accordance with an embodiment.
Figure 6B:
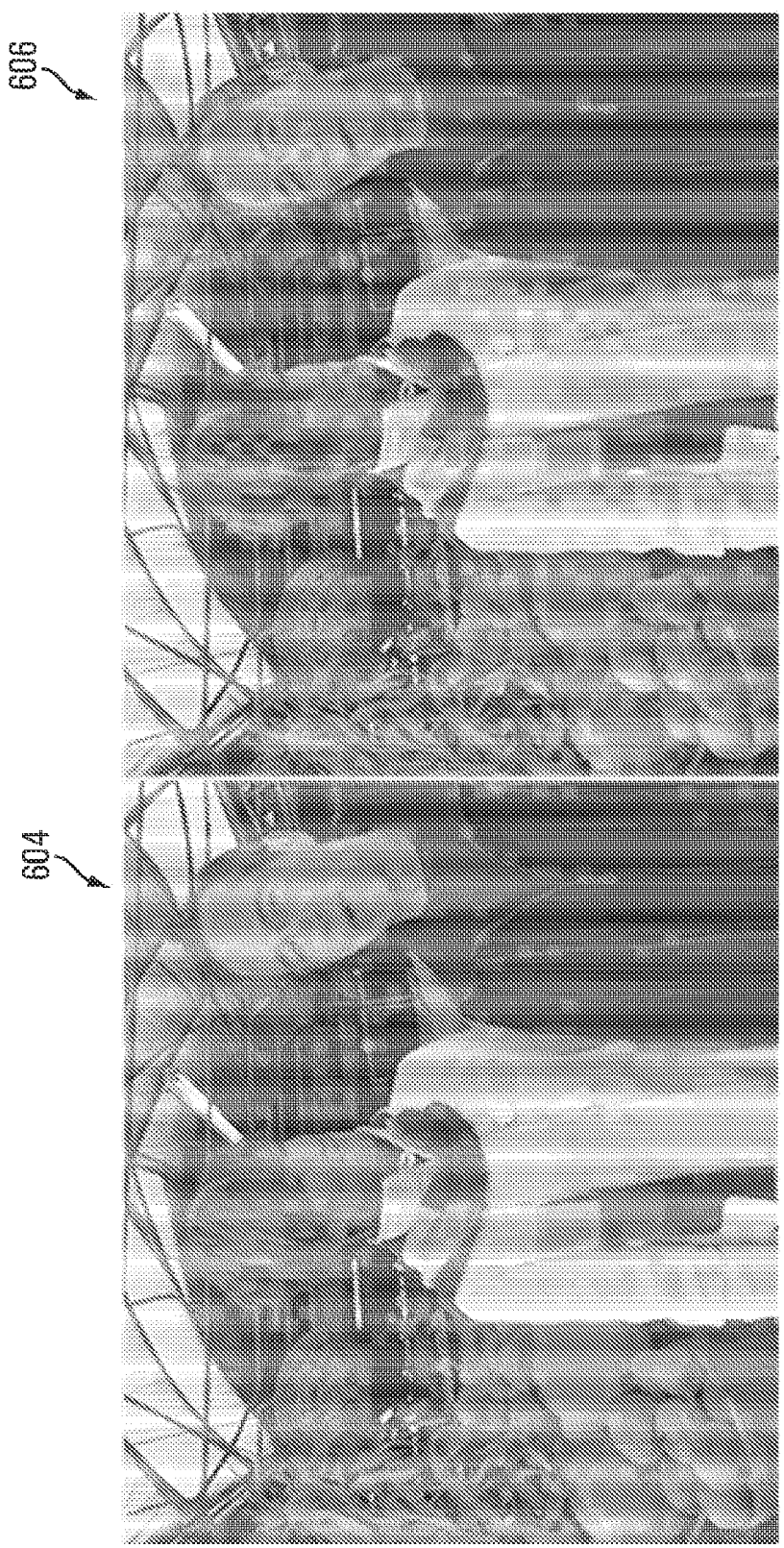

Visualizer 120 generates digital visualizations that show the locations of artefacts detected by artefact detector 106. For example, FIG. 6A (image 600, left) shows the location of detected MotionDisparity artefacts in an example video frame, and FIG. 6A (image 602, right) shows the location of detected MotionDisparity and flickering artefacts in that frame. Similarly, FIG. 6B (image 604, left) shows the location of detected MotionDisparity artefacts in another example video frame, and FIG. 6B (image 606, right) shows the location of detected MotionDisparity and flickering artefacts in that frame.

Each of artefact selector 104, artefact detector 106, raw metric calculator 108, MOS metric calculator 110, cartography generator 120, and visualizer 122 may be implemented using conventional programming languages such as Java, J#, C, C++, C#, Perl, Visual Basic, Ruby, Scala, etc. These components of system 100 may be in the form of one or more executable programs, scripts, routines, statically/dynamically linkable libraries, or servlets. Aspects of these components may be implemented using GPU optimizations to take advantage of parallelized computation.

Figure 7:
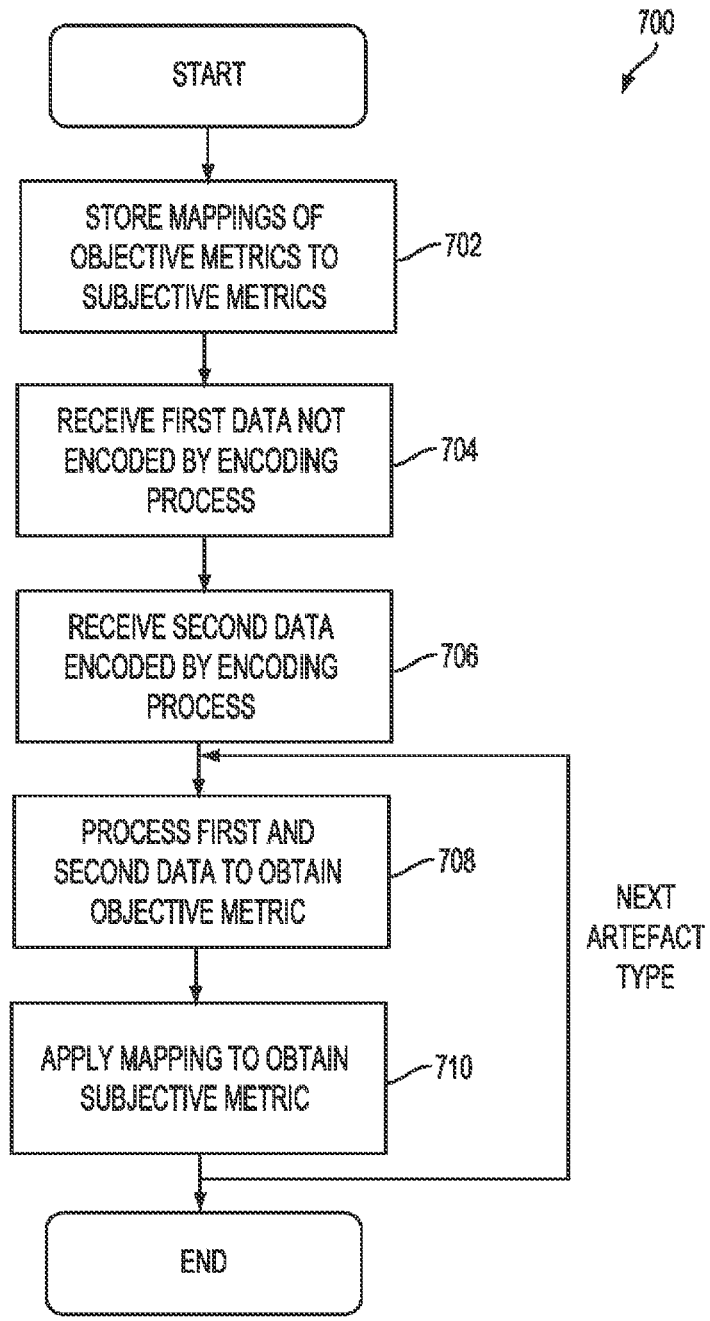
FIG. 7 is a flowchart showing example operations performed at the visual quality assessment system of FIG. 1, in accordance with an embodiment.

The operation of visual quality assessment system 100 is further described with reference to the flowchart depicted in FIG. 7. In this depicted example operation, system 100 performs the operations depicted at blocks 700 and onward. Operation begins at block 702. At this block, system 100 creates data structures and performs initializations to ready the system for conducting visual degradation assessments. For example, mappings of objective metrics to subject metrics are obtained in manners described above and stored in electronic datastore 118.

Next, system 100 begins assessment of a particular digital content item 112. For example, at block 704, artefact detector 106 receives first data 114 for item 112 that is not encoded by the encoding process under assessment (i.e., original or raw form); and at block 706, artefact detector 106 receives second data 116 for item 112 that is encoded by the encoding process under assessment (i.e., degraded form). Artefact selector 104 generates a list of artefact types relevant to the encoding processes.

Next, system 100 processes original content 114 and degraded content 116 to measure the visual degradation attributable to each artefact type in the list of relevant artefact types. Specifically, at block 708, system 100 processes original content 114 and degraded content 116 to obtain an objective metric for a first artefact type. For some artefact types, system 100 measures this visual degradation based on processing the degraded content 116 alone without processing original content 114. The operations of block 708 are performed by artefact detector 106 and raw metric calculator 108 working in concert.

Next at block 710, system 100 calculates a subjective metric for the first artefact type by applying a mapping stored in electronic datastore 118 to the objective metric obtained at block 708. Once this is completed, blocks 708 and 710 are repeated for each artefact type until a plurality of subjective metrics are obtained, each measuring on a subjective basis, the visual quality degradation attributable to a particular artefact type.

Figure 8:
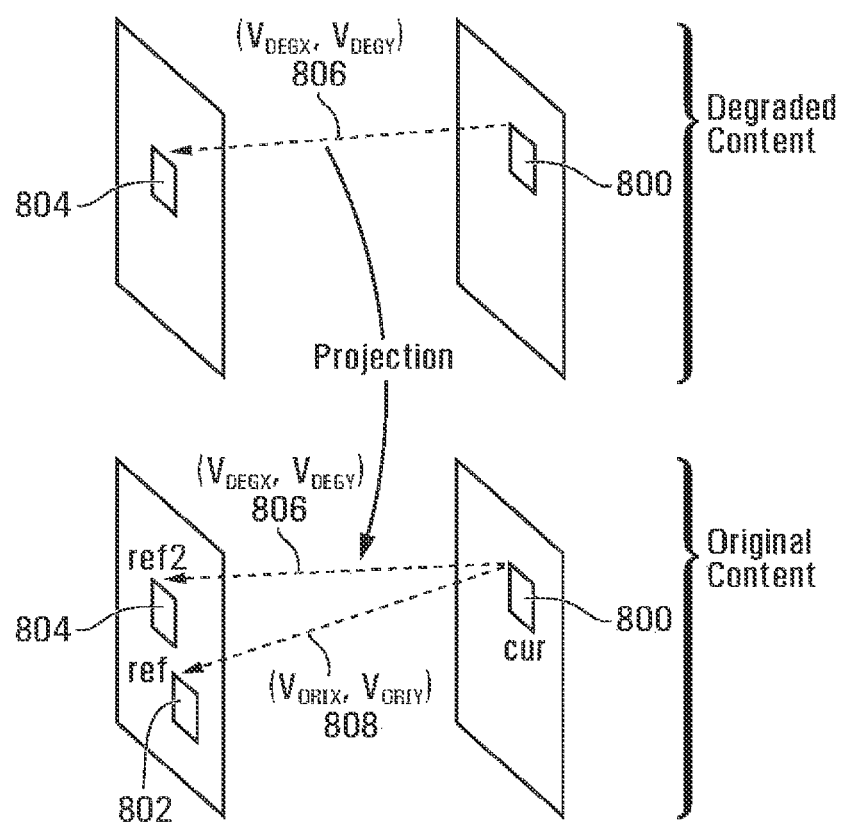
FIG. 8 schematically illustrates mapping of a motion vector in the course of assessing distortion caused by a temporal artefact, in accordance with an embodiment.

The operations at block 708 are elaborated upon for one example artefact type, namely, the MotionDisparity artefact type, with reference to FIG. 8.

Motion vectors are extracted from original content 114 and degraded content 116 on a block basis. In one example, block are 8×8 pixels in size, while in another example, block are 16×16 pixels in size. Of course, the methods described herein can be applied to any block size, as may be appropriate for a particular content item and a particular artefact type.

In the depicted embodiment, motion vectors are computing using hierarchical motion estimation. Video frames are downsampled several times yielding several sub resolutions. For the lowest sub-resolution, a full search step computes coarse vectors which are spatially projected at the next higher sub resolution. These vectors are then refined using another fast full search step. This process is repeated for each intermediate sub resolution until reaching the original size of the frame.

Referring to FIG. 8, and proceeding on a block basis, two motion vectors are estimated: motion vector 806 (VDEGX, VDEGY) for degraded content 116 and motion vector 808 (VORIX, VORIY) for original content 114. The temporal distortion is calculated as follows.

Compute the temporal distortion in original content 114 between two consecutive frames "Cur" (frame region 800) and "Ref" (frame region 802) using a simplified SSIM calculation shown in Eq. (1):

$$SSIM_{ORI}(V_{ORIX}, V_{ORIY}) = \frac{2 * \sigma_{CurRef} + 1}{\sigma_{CurCur} + \sigma_{RefRef} + 1}$$

Compute the temporal distortion in degraded content 116 between two consecutive frames "Cur" (frame region 800) and "Ref2" (frame region 804, obtained by projecting motion vector 806 onto original content 114) using a simplified SSIM calculation shown in Eq. (2):

$$SSIM_{ORI}(V_{DEGX}, V_{DEGY}) = \frac{2 * \sigma_{CurRef2} + 1}{\sigma_{CurCur} + \sigma_{Ref2Ref2} + 1}$$

Compute the delta temporal distortion using Eq. (3):

Delta=$SSIM_{ORI}(V_{ORIX}, V_{ORIY})$−$SSIM_{ORI}(V_{DEGX}, V_{DEGY})$

The block distortion is calculated using Eq. (4) and Eq. (5):

$$\text{distortion} = \begin{cases} 0, & \text{if } DIST_{ORI}(V_{ORIX}, V_{ORIY}) = 0 \text{ or delta} < 0 \\ \text{Delta}, & \text{otherwise} \end{cases}$$

where $Dist_{ORI}(V_{ORIX}, V_{ORIY}) = 1 - SSIM_{ORI}(V_{ORIX}, V_{ORIY})$

The distortion in Eq. (4) is normalized and converted into a ratio in Eq. (6):

$$\text{ratio} = \begin{cases} 0, & \text{if } DIST_{ORI}(V_{ORIX}, V_{ORIY}) = 0 \text{ or delta} < 0 \\ \dfrac{\text{Delta}}{DIST_{ORI}(V_{ORIX}, V_{ORIY})}, & \text{otherwise} \end{cases}$$

A block is classified as "motionDisparity" if the ratio in Eq. (6) exceeds a pre-defined limit, otherwise the block is classified as "not motionDisparity".

The overall frame distortion is calculated using Eq. (7):

$$\text{motionDisparity} = \frac{\text{average distortion of blocks classified } motionDisparity}{\text{average distortion of blocks classified not } motionDisparity}$$

where there are N blocks classified "motionDisparity" and M blocks classified "not motionDisparity" and $$\text{average distortion of blocks classified } motionDisparity = \frac{\text{sum of the } N \text{ distortions}}{M+N}$$

$$\text{average distortion of blocks classified not } motionDisparity = \frac{\text{sum of the } M \text{ distortions}}{M+N}$$

If the value of "average distortion of blocks classified as not motionDisparity" is zero, then the value of "motionDisparity" of Eq. (6) is set to a pre-defined maximum value.

Objective metrics for other artefact types including, e.g., Ringing, Blurring, Wobble, Flickering, and Pulsing can be calculated in various manners known to those of ordinary skill in the art.

Figure 9:
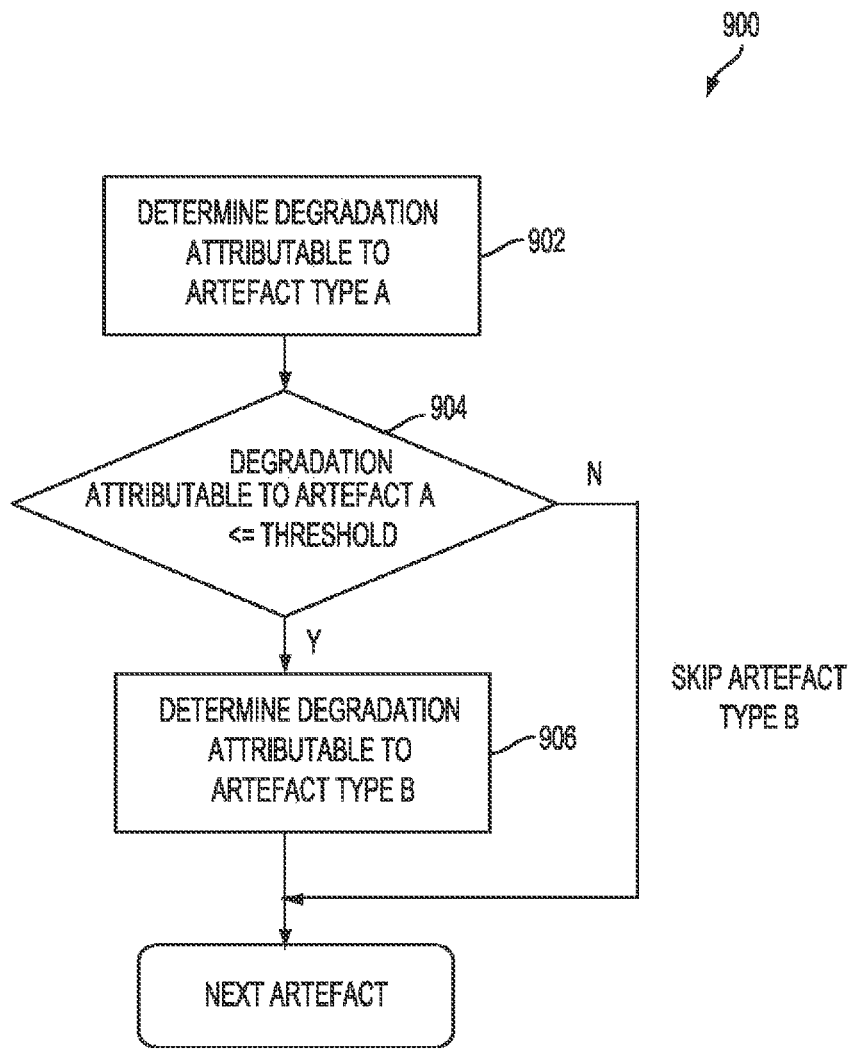
FIG. 9 is a flowchart showing example operations in accordance with a hierarchical framework of an embodiment.

In some embodiments, visual quality assessment system 100 may generate metrics of visual quality degradation according to a pre-defined hierarchy such that processing is performed for a lower ordered one of the visual artefact types for at least part of a digital content item (e.g., at least one block) after processing for a higher ordered one of the visual artefacts types is performed for the at least part of the digital content item (e.g., at least one block). More specifically, as shown in FIG. 9, when degradation attributable to an artefact type A (higher ranked in the hierarchy) is found to be dominant, assessment of visual quality degradation attributable to an artefact type B (lower ranked in hierarchy) may be skipped. In some embodiments, degradation attribute to multiple artefact types may be skipped.

Operation of system 100 in accordance with a hierarchical framework is further described with reference to operations shown at block 900 and onward of FIG. 9. As shown, raw metric calculator 108 determines degradation attributable to artefact type A at block 902. Next, at block 904, raw metric calculator 108 compares this degradation value to a pre-defined threshold. If the threshold is not exceeded (e.g., below a pre-defined threshold), then raw metric calculator 108 continues onward to block 906 and determines degradation attributable to artefact type B. However, if the threshold is exceeded, then raw metric calculator 108 skips block 906.

Referring now to a specific example, in one embodiment, artefact type A is MotionDisparity and artefact type B is flickering. Upon determining degradation attributable to MotionDisparity, a block distortion is obtained using Eq. (4) and Eq. (5). Next, a ratio is calculated according to Eq. (6). This ratio is compared to a pre-defined threshold, and if the ratio is greater than that threshold, then determination of degradation attributable to flickering is skipped for the current block.

In above-described embodiment, the hierarchical framework is applied on a block basis so that calculations associated with artefact type B are skipped for certain blocks. In other embodiments, the hierarchical framework is applied on a frame basis so that calculations artefact type B are skipped for an entire frame.

In some embodiments, assessment system 100 may be used to implement parts of a quality assurance process. In such embodiments, system 100 may include a notification generator that monitors the output of MOS metric calculator 110. This notification generator generates an automatic electronic notification (e.g., an e-mail message, code, or alarm) when one or more of the metrics calculated by MOS metric calculator 110 exceeds a pre-defined threshold. Optionally, the metrics may be aggregated over a data set (e.g., an entire video or an image sequence) and aggregated metrics may be used to trigger automated notifications.

Conveniently, as each of these metrics (aggregated or otherwise) measures degradation attributable to a particular artefact type, independent thresholds may be set for each artefact type. The particular thresholds can be set based on the target audience for particular content items 112, e.g., based on expected psychovisual defects perception characteristics of that audience. Such thresholds may for example be stored as part of metadata for particular content items 112 in electronic datastore 102.

In some embodiments, visual quality assessment system 100 may be configured to measure visual quality degradation of a digital content item 112 even when its electronic datastore 102 does not store data for that item 112 in a first form 114 (i.e., data for the original content such as, for example, in an uncompressed form). In such embodiments, system 100 includes a decoder that decodes the data in the second form 116 to generate the data in the first form. Data may be decoded to a specific colour space.

Figure 10:
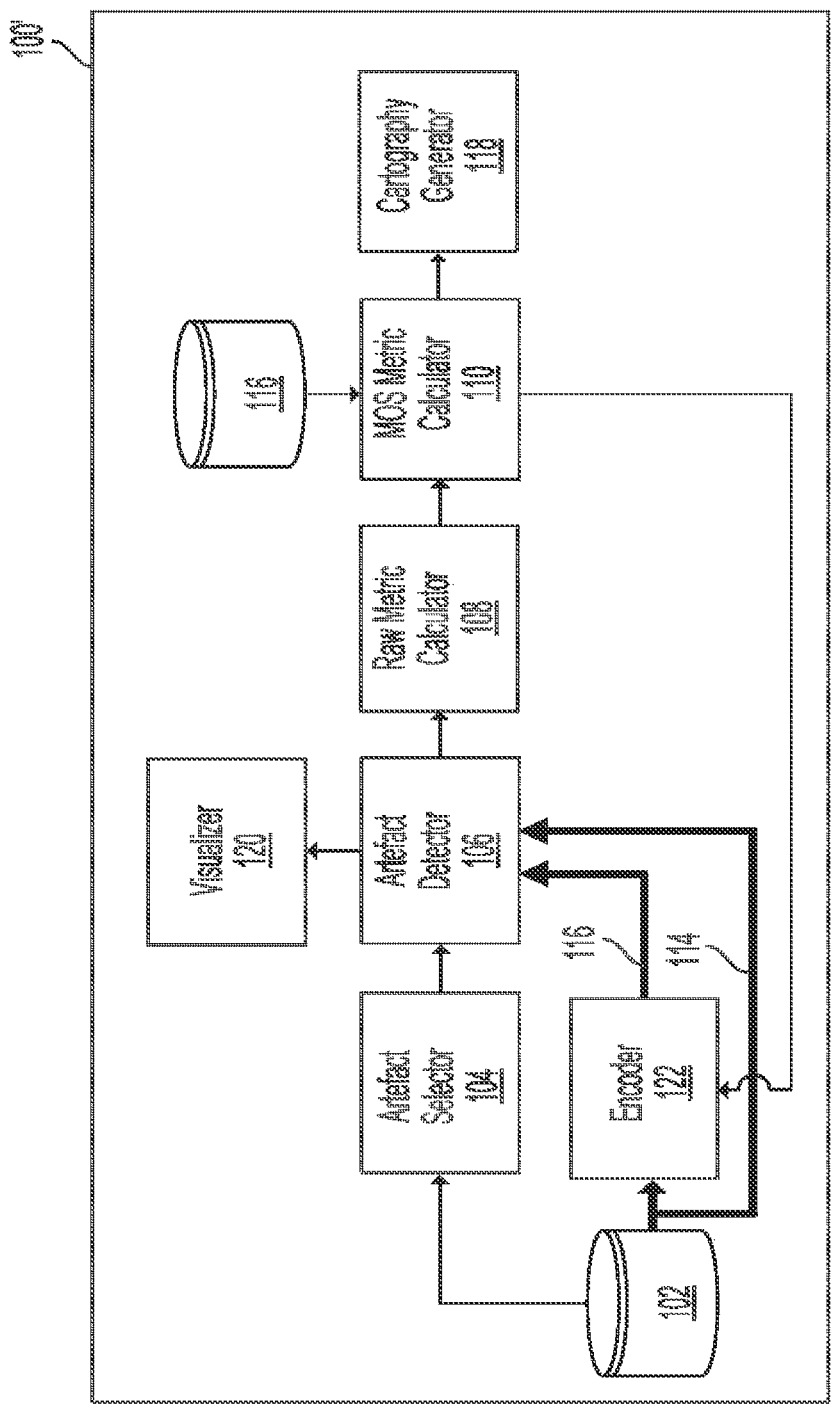
FIG. 10 is a schematic diagram of a visual quality assessment system, in accordance with another embodiment.

FIG. 10 depicts a visual quality assessment system 100', in accordance with an embodiment. As shown, system 100' includes an encoder 122 that encodes first data 114 for a digital content item 112 (i.e., in original or raw form) to produce second data 116 for the item 112 (i.e., in degraded form). In this embodiment, electronic datastore 102 does not need to store such second data.

Further, in this embodiment, assessment system 100' may be configured to automatically re-encode first data 114 for a digital content item 112, based on the result of the visual quality assessment described herein. For example, upon determining that the subjective metrics for a particular content item 112 (which may be aggregated as noted above) show degradation beyond a certain degree (e.g., one or more of the metrics are below a pre-defined threshold), encoder 122 may automatically re-encode first data 114 to reduce degradation. For example, encoder 122 may re-encode first data using a different encoding process, using a higher bit-rate, or based on adjusting certain other encoding parameters, e.g., as shown in FIG. 5B and FIG. 5C).

System 100' is otherwise substantially similar to system 100.

Figure 11:
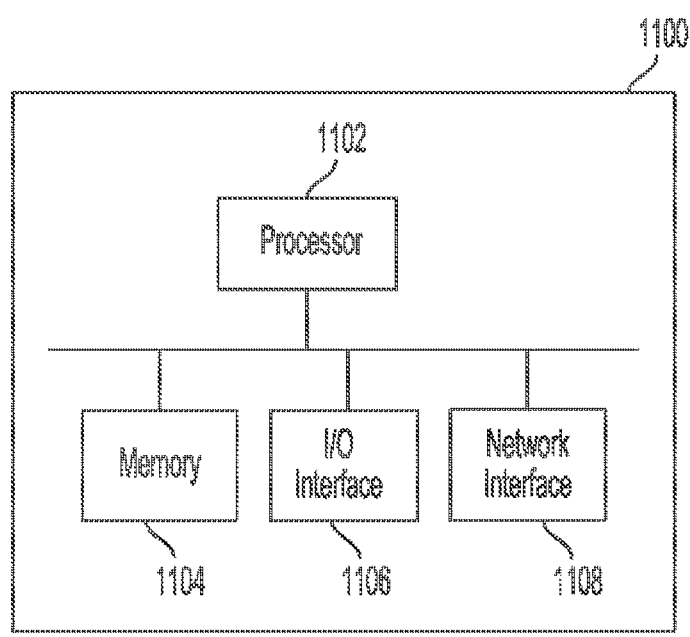
FIG. 11 is a schematic diagram of computing device for implementing a visual quality assessment system, in accordance with an embodiment.

FIG. 11 is a schematic diagram of computing device 1100 which may be used to implement assessment system 100 (or system 100'), exemplary of an embodiment. As depicted, computing device 1100 includes at least one processor 1102, memory 1104, at least one I/O interface 1106, and at least one network interface 1108.

Each processor 1102 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1104 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1106 enables computing device 1100 to interconnect with one or more input devices, such as a keyboard, mouse, camera, touch screen and a microphone, or with one or more output devices such as a display screen and a speaker.

Each network interface 1108 enables computing device 1100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 1100 is shown but system 100 may include multiple computing devices 1100. The computing devices 1100 may be the same or different types of devices. The computing devices 1100 may be connected in various ways including directly coupled, indirectly coupled via a network, and distributed over a wide geographic area and connected via a network (which may be referred to as "cloud computing").

For example, and without limitation, a computing device 1100 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer-implemented method for measuring visual quality degradation of digital content caused by an encoding process, the method comprising:
   storing, for each of a plurality of visual artefact types: a corresponding mapping from (i) quality metrics measuring visual quality degradation attributable to a given visual artefact type, measured on an objective basis, to (ii) quality metrics measuring visual quality degradation attributable to the given visual artefact type, which approximate subjective assessment by a human visual system;
   for a given one of the plurality of visual artefact types:
      processing first data and second data to obtain a first quality metric measuring visual quality degradation in a digital content item attributable to the given visual artefact type caused by the encoding process, the first data and the second data corresponding to a digital content item, the first data not encoded by the encoding process, the second data encoded by the encoding process, wherein the first quality metric is an objective metric; and
      applying the mapping, corresponding to the given visual artefact type, to the first quality metric to output a second quality metric, wherein the second quality metric measures visual quality degradation in the digital content item attributable to the given visual artefact type caused by the encoding process and approximates subjective assessment of the digital content item by the human visual system, wherein the second quality metric is a subjective metric; and
   for at least one other given one of the plurality of visual artefact types, repeating said processing and said applying to output at least one other second quality metric corresponding to the at least one other given one of the plurality of visual artefact types.

2. The computer-implemented method of claim 1, wherein the digital content item comprises an image and wherein the at least one of the plurality of visual artefact types includes a type of spatial artefact.

3. The computer-implemented method of claim 1, wherein the digital content item comprises at least one of an image sequence and a video, and wherein the plurality of visual artefact types includes a type of temporal artefact.

4. The computer-implemented method of claim 3, wherein the plurality of visual artefact types further includes a type of spatial artefact.

5. The computer-implemented method of claim 1, wherein said processing and said applying are repeated for the plurality of visual artefact types to obtain a plurality of second quality metrics, each for a corresponding one of the plurality of visual artefact types.

6. The computer-implemented method of claim 5, further comprising generating a graphical representation of the plurality of second quality metrics.

7. The computer-implemented method of claim 6, wherein the graphical representation comprises a radar graph.

8. The computer-implemented method of claim 1, wherein said processing to obtain the first quality metric is performed for the plurality of visual artefact types according to a pre-defined hierarchy such that said processing is performed for a lower ordered one of the visual artefact types for at least part of the digital content item after said processing for a higher ordered one of the visual artefacts types is performed for the at least part of the digital content item.

9. The computer-implemented method of claim 8, wherein said processing for the lower ordered one of the visual artefact types is performed upon determining that visual quality degradation attributable to the higher ordered one of the visual artefacts types does not exceed a pre-defined threshold.

10. The computer-implemented method of claim 1, wherein the first data comprises color data in a color space that is at least one of YUV, RGV, XYZ, CIELAB, or IPT.

11. The computer-implemented method of claim 1, wherein the at least one of the plurality of visual artefact types includes at least two visual artefact types.

12. The computer-implemented method of claim 1, wherein the encoding process comprises at least one of: a compression process, a filtering process, or a conversion process between high dynamic range and standard dynamic range.

13. The computer-implemented method of claim 1, further comprising requesting re-encoding of the digital content item upon determining that at least one of the second quality metrics reflects visual quality degradation above a pre-defined threshold.

14. The computer-implemented method of claim 13, further comprising selecting a parameter for the re-encoding based on a magnitude of the at least one of the second quality metrics.

15. The computer-implemented method of claim 8, wherein performing said processing for the lower ordered one of the visual artefact types for at least part of the digital content item is skipped based on a determination that visual quality degradation attributable to the higher ordered one of the visual artefacts types exceeds a pre-defined threshold.

16. A computing system for measuring visual quality degradation of digital content caused by an encoding process, the computing system comprising:
   at least one memory storing:
      for each of a plurality of visual artefact types: a corresponding mapping from (i) quality metrics measuring visual quality degradation attributable to a given visual artefact type, measured on an objective basis to (ii) quality metrics measuring visual quality degradation attributable to the given visual artefact type, which approximate subjective assessment by a human visual system; and
      processor-executable instructions;
   at least one processor in communication with the at least one memory, the at least one processor configured to execute the processor-executable instructions to:
   for a given one of the plurality of visual artefact types:
      process first data and second data to obtain a first quality metric measuring visual quality degradation in a digital content item attributable to the given visual artefact type caused by the encoding process, the first data and the second data corresponding to a digital content item, the first data not encoded by the encoding process, the second data encoded by the encoding process, wherein the first quality metric is an objective metric; and
      apply the mapping, corresponding to the given visual artefact type, to the first quality metric to output a second quality metric, wherein the second quality metric measures visual quality degradation in the digital content item attributable to the given visual artefact type caused by the encoding process and approximates subjective assessment of the digital content item by the human visual system, wherein the second quality metric is a subjective metric; and for at least one other given one of the plurality of visual artefact types, repeat said processing and said applying to output at least one other second quality metric corresponding to the at least one other given one of the plurality of visual artefact types.

17. The computing system of claim 16, wherein processing the first data and the second data to obtain the first quality metric is performed for the plurality of visual artefact types according to a pre-defined hierarchy such that processing the first data and the second data is performed for a lower ordered one of the visual artefact types for at least part of the digital content item after processing the first data and the second data for a higher ordered one of the visual artefacts types is performed for the at least part of the digital content item.

18. The computing system of claim 17, wherein performing said processing for the lower ordered one of the visual artefact types for at least part of the digital content item is skipped based on a determination that visual quality degradation attributable to the higher ordered one of the visual artefacts types exceeds a pre-defined threshold.

19. The computing system of claim 17, wherein said processing for the lower ordered one of the visual artefact types is performed upon determining that visual quality degradation attributable to the higher ordered one of the visual artefacts types does not exceed a pre-defined threshold.

20. The computing system of claim 16, wherein the plurality of visual artefact types includes a type of temporal artefact and a type of spatial artefact.

* * * * *